United States Patent
Adams

(10) Patent No.: US 10,171,250 B2
(45) Date of Patent: *Jan. 1, 2019

(54) DETECTING AND PREVENTING MAN-IN-THE-MIDDLE ATTACKS ON AN ENCRYPTED CONNECTION

(71) Applicant: Juniper Networks, Inc., Sunnyvale, CA (US)

(72) Inventor: Kyle Adams, Brisbane, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/659,106

(22) Filed: Jul. 25, 2017

(65) Prior Publication Data

US 2017/0331634 A1 Nov. 16, 2017

Related U.S. Application Data

(63) Continuation of application No. 14/042,042, filed on Sep. 30, 2013, now Pat. No. 9,722,801.

(51) Int. Cl.
*H04L 9/32* (2006.01)
*H04L 29/06* (2006.01)

(52) U.S. Cl.
CPC .......... *H04L 9/3268* (2013.01); *H04L 9/3239* (2013.01); *H04L 63/0428* (2013.01);
(Continued)

(58) Field of Classification Search
CPC ..... H04L 9/3268; H04L 9/3239; H04L 63/12; H04L 63/0428; H04L 63/0823; H04L 63/1466
See application file for complete search history.

(56) References Cited

U.S. PATENT DOCUMENTS 7,360,096 B2  4/2008  Bracewell et al.
8,484,460 B1*  7/2013  Vaughn ............... H04L 63/0823
                                                  713/155
(Continued)

FOREIGN PATENT DOCUMENTS

CN   1505309 A   6/2004
EP   1868134    12/2007
(Continued)

OTHER PUBLICATIONS

Wikipedia, "Man-in-the-middle attack", http://en.wikipedia.org/wiki/Man-in-the-middle_attack, Sep. 1, 2013, 5 pages.
(Continued)

*Primary Examiner* — Joseph P Hirl
*Assistant Examiner* — Stephen Gundry
(74) *Attorney, Agent, or Firm* — Harrity & Harrity, LLP

(57) ABSTRACT

A client device may provide, to a host device, a request to access a website associated with a host domain. The client device may receive, based on the request, verification code that identifies a verification domain and a resource, associated with the verification domain, to be requested to verify a public key certificate. The verification domain may be different from the host domain. The client device may execute the verification code, and may request the resource from the verification domain based on executing the verification code. The client device may determine whether the requested resource was received, and may selectively perform a first action or a second action based on determining whether the requested resource was received. The first action may indicate that the public key certificate is not valid, and the second action may indicate that the public key certificate is valid.

20 Claims, 14 Drawing Sheets

(52) U.S. Cl.
 CPC .......... *H04L 63/0823* (2013.01); *H04L 63/12*
                     (2013.01); *H04L 63/1466* (2013.01)

(56) References Cited

U.S. PATENT DOCUMENTS

| | | | |
|---|---|---|---|
| 8,621,078 B1* | 12/2013 | Mukerji | H04L 67/2814 709/225 |
| 8,677,466 B1* | 3/2014 | Chuang | H04L 9/321 709/229 |
| 8,694,784 B1* | 4/2014 | Lekies | H04L 9/3226 713/169 |
| 8,713,644 B2* | 4/2014 | Krishna | G06F 21/34 726/4 |
| 8,732,472 B2* | 5/2014 | Grebennikov | H04L 9/3263 713/156 |
| 8,775,524 B2* | 7/2014 | Nissenboim | H04L 63/20 709/206 |
| 8,776,238 B2* | 7/2014 | Pomerantz | H04L 63/20 713/156 |
| 8,788,809 B2* | 7/2014 | Kelley | G06F 21/51 713/156 |
| 8,850,526 B2* | 9/2014 | Jayaraman | G06F 21/51 713/165 |
| 8,869,259 B1* | 10/2014 | Udupa | H04L 63/0823 726/10 |
| 8,880,885 B2* | 11/2014 | Lekies | H04L 9/0841 713/169 |
| 8,966,267 B1 | 2/2015 | Pahl | |
| 9,053,297 B1* | 6/2015 | Fitch | G06F 21/34 |
| 9,117,062 B1* | 8/2015 | Fitch | G06F 21/30 |
| 9,118,666 B2* | 8/2015 | Naguib | G06F 21/575 |
| 9,130,996 B1 | 9/2015 | Martini | |
| 9,160,718 B2* | 10/2015 | Martini | H04L 63/0428 |
| 9,166,969 B2* | 10/2015 | Hershberg | H04L 63/083 |
| 9,178,888 B2* | 11/2015 | Thayer | H04L 63/10 |
| 9,225,510 B1* | 12/2015 | Wharton | H04L 63/0823 |
| 9,225,511 B1* | 12/2015 | Wharton | H04L 9/00 |
| 9,225,690 B1* | 12/2015 | Fitch | H04L 63/0428 |
| 9,282,092 B1* | 3/2016 | Shankar | H04L 63/0823 |
| 9,521,138 B2* | 12/2016 | Thayer | H04L 63/1441 |
| 9,584,328 B1 | 2/2017 | Graham | |
| 9,704,158 B2* | 7/2017 | Dundas | G06Q 20/3825 |
| 9,705,915 B2* | 7/2017 | Johansson | G06F 21/31 |
| 9,722,801 B2* | 8/2017 | Adams | H04L 63/0428 |
| 9,749,292 B2* | 8/2017 | Martini | H04L 63/0209 |
| 9,819,717 B2 | 11/2017 | Oyman et al. | |
| 9,838,380 B2* | 12/2017 | Sauve | H04L 63/0823 |
| 9,843,573 B2* | 12/2017 | Wharton | H04L 63/0823 |
| 9,853,964 B2* | 12/2017 | Chester | H04L 9/14 |
| 2006/0015722 A1 | 1/2006 | Rowan | |
| 2006/0230272 A1* | 10/2006 | Lawrence | H04L 63/126 713/176 |
| 2007/0180225 A1 | 8/2007 | Schmidt | |
| 2007/0234409 A1 | 10/2007 | Eisen | |
| 2008/0052775 A1* | 2/2008 | Sandhu | G06F 21/6263 726/14 |
| 2008/0077791 A1 | 3/2008 | Lund | |
| 2008/0104672 A1* | 5/2008 | Lunde | H04L 63/1441 726/3 |
| 2008/0295169 A1 | 11/2008 | Crume | |
| 2009/0254745 A1 | 10/2009 | Ganesan | |
| 2009/0307486 A1* | 12/2009 | Grajek | H04L 63/0272 713/156 |
| 2010/0017596 A1 | 1/2010 | Schertzinger | |
| 2010/0031041 A1 | 2/2010 | Cohen | |
| 2010/0050243 A1 | 2/2010 | Hardt | |
| 2010/0088766 A1* | 4/2010 | Michaely | H04L 63/1441 726/23 |
| 2010/0275014 A1* | 10/2010 | Kelley | G06F 21/51 713/157 |
| 2011/0055562 A1 | 3/2011 | Adelman | |
| 2011/0239288 A1 | 9/2011 | Cross | |
| 2011/0320818 A1* | 12/2011 | Krishna | G06F 21/34 713/175 |
| 2011/0321139 A1* | 12/2011 | Jayaraman | G06F 21/51 726/4 |
| 2013/0019090 A1* | 1/2013 | Wicker | H04L 63/0823 713/151 |
| 2013/0019092 A1* | 1/2013 | Levow | G06F 21/606 713/155 |
| 2013/0031356 A1* | 1/2013 | Prince | H04L 63/0823 713/151 |
| 2013/0061038 A1* | 3/2013 | Pao | H04L 63/0823 713/151 |
| 2013/0085914 A1 | 4/2013 | McPherson | |
| 2013/0145158 A1* | 6/2013 | Pao | H04L 9/0891 713/158 |
| 2013/0198065 A1* | 8/2013 | McPherson | H04L 61/1511 705/40 |
| 2013/0205133 A1* | 8/2013 | Hess | H04L 63/0884 713/155 |
| 2013/0205380 A1* | 8/2013 | Avni | H04L 63/0853 726/7 |
| 2013/0254535 A1* | 9/2013 | Akehurst | H04L 29/06 713/158 |
| 2013/0311769 A1* | 11/2013 | Hayes | H04L 63/0442 713/155 |
| 2013/0312079 A1* | 11/2013 | McCallum | H04L 63/0823 726/10 |
| 2014/0037074 A1 | 2/2014 | Bravo | |
| 2014/0101442 A1* | 4/2014 | Pao | H04L 9/0891 713/158 |
| 2014/0165147 A1* | 6/2014 | Hershberg | H04L 63/083 726/4 |
| 2014/0181895 A1* | 6/2014 | Kelly | H04L 63/102 726/1 |
| 2014/0189808 A1* | 7/2014 | Mahaffey | H04L 63/083 726/4 |
| 2014/0250008 A1* | 9/2014 | Dundas | G06Q 20/40 705/44 |
| 2014/0289831 A1* | 9/2014 | Prakash | H04L 9/3228 726/7 |
| 2014/0317730 A1* | 10/2014 | Ashley | H04L 63/12 726/22 |
| 2014/0351573 A1* | 11/2014 | Martini | H04L 63/0428 713/153 |
| 2014/0373097 A1* | 12/2014 | Thayer | H04L 63/0823 726/4 |
| 2014/0373127 A1* | 12/2014 | Thayer | H04L 63/10 726/10 |
| 2014/0380453 A1* | 12/2014 | Alonso Cebrian | H04L 63/0838 726/9 |
| 2015/0200934 A1* | 7/2015 | Naguib | G06F 21/575 713/2 |
| 2015/0229481 A1* | 8/2015 | Prince | H04L 63/0823 713/175 |
| 2015/0365394 A1* | 12/2015 | Fitch | G06F 21/30 726/7 |
| 2015/0372994 A1 | 12/2015 | Stuntebeck | |
| 2015/0381583 A1* | 12/2015 | Martini | H04L 63/0428 713/153 |
| 2016/0014114 A1 | 1/2016 | Pahl | |
| 2016/0087974 A1* | 3/2016 | Wharton | H04L 63/0823 726/10 |
| 2016/0156598 A1* | 6/2016 | Alonso Cebrian | H04L 63/0838 713/168 |
| 2016/0218881 A1* | 7/2016 | Adams | H04L 63/0428 |
| 2016/0285861 A1* | 9/2016 | Chester | H04L 9/14 |
| 2017/0013013 A1* | 1/2017 | Johansson | G06F 21/31 |
| 2017/0026186 A1* | 1/2017 | Gu | |
| 2017/0041151 A1 | 2/2017 | Kommirreddy | |
| 2017/0187521 A1* | 6/2017 | Fitch | H04L 9/085 |

FOREIGN PATENT DOCUMENTS

| | | |
|---|---|---|
| WO | WO2013100967 A1 | 7/2013 |
| WO | WO2013100968 A1 | 7/2013 |

(56) References Cited

FOREIGN PATENT DOCUMENTS

OTHER PUBLICATIONS

Wikipedia, "Public key certificate", http://en.wikipedia.org/wiki/Public_key_certificate, Aug. 14, 2013, 7 pages.
Wayne Berry, "Sharing Cookies Across Domains", http://www.codeguru.com/csharp/csharp/cs_internet/article.php/c19417/Sharing-Cookies-Across-Domains.htm, Jan. 10, 2008, 29 pages.
European Search Report corresponding to EP 14186529 dated Jan. 19, 2015, 8 pages.

* cited by examiner

US 10,171,250 B2

DETECTING AND PREVENTING MAN-IN-THE-MIDDLE ATTACKS ON AN ENCRYPTED CONNECTION

RELATED APPLICATION

This application is a continuation of U.S. patent application Ser. No. 14/042,042, filed Sep. 30, 2013 (now U.S. Pat. No. 9,722,801), which is incorporated herein by reference.

BACKGROUND

A man-in-the-middle attack is a form of computer security breach in which an attacker (e.g., a hacker) makes independent connections with the victims' computers and relays messages between them, leading the victims to believe that the victims are communicating directly with one another over a secure connection, when in fact the communications are controlled by the attacker. To perform a man-in-the-middle attack, the attacker intercepts messages between the two victims and injects new messages, which are then sent to the victims. If the connection between the victims is encrypted, the attacker may circumvent the encryption by tricking a user (e.g., an end user at a client device) into accepting the attacker's public key certificate, rather than accepting a trusted certificate authenticated by a certification authority. The attacker may accept a trusted certificate from the other victim (e.g., a web site hosted on a host device). In this way, the attacker can use the certificates with both victims to establish encrypted communication sessions with both victims, and can intercept, decrypt, alter, remove, and insert messages between the victims, thus acting as a man-in-the-middle.

SUMMARY

According to some possible implementations, a device may include one or more processors configured to: provide a request to access a host domain; receive, based on the request to access the host domain, verification code that identifies a verification domain and a resource, accessible via the verification domain, for verifying a public key certificate, where the verification domain is different from the host domain; execute the verification code; request the resource from the verification domain based on executing the verification code; determine whether the requested resource was received; and selectively perform a first action or a second action based on whether the requested resource was received, where the first action, identified in the verification code, is performed based on determining that the requested resource was not received, where the first action indicates that the public key certificate was not verified; and where the second action is performed based on determining that the requested resource was received, and where the second action is different from the first action.

According to some possible implementations, a computer-readable medium may store one or more instructions that, when executed by one or more processors, cause the one or more processors to: provide a request to a host device associated with a host domain; receive, based on the request, content of a web page from the host device, where the content of the web page includes information regarding verification code that identifies a verification domain and a resource, associated with the verification domain, to be used to verify a public key certificate, where the verification domain is different from the host domain; request the resource from the verification domain based on the verification code; determine whether the requested resource was received; and selectively perform a first action or a second action based on whether the requested resource was received, where the first action indicates that the public key certificate is invalid; where the second action indicates that the public key certificate is valid, and where the second action is different from the first action.

According to some possible implementations, a method may include: providing, by a client device and to a host device, a request to access a website associated with a host domain; receiving, by the client device and based on the request, verification code that identifies a verification domain and a resource, associated with the verification domain, to be requested to verify a public key certificate, where the verification domain is different from the host domain; executing, by the client device, the verification code; requesting, by the client device, the resource from the verification domain based on executing the verification code; determining, by the client device, whether the requested resource was received; and selectively performing a first action or a second action based on determining whether the requested resource was received; where the first action indicates that the public key certificate is not valid; and where the second action indicates that the public key certificate is valid.

DETAILED DESCRIPTION

The following detailed description of example implementations refers to the accompanying drawings. The same reference numbers in different drawings may identify the same or similar elements.

When a client device is establishing a secure communication session (e.g., a secure socket layer (SSL) session) with a host device, such as when a user of the client device navigates to a secure website hosted by the host device, the host device typically sends a public key certificate to the client device to verify the identity of the host device. This certificate may identify the initial encryption key for the session. If the client device recognizes the certificate as valid (e.g., if a browser running on the client device is able to verify that the certificate is signed by a trusted certificate authority), then the client device may permit the user to access the secure website. If the client device does not recognize the certificate as valid, the client device may not permit the user to access the secure website.

In some instances, the client device may identify the certificate as invalid, but a user may provide an indication to accept the invalid certificate. Because some users may accept invalid certificates, an attacker (e.g., a hacker) may be able to intercept messages between the client device and the host device by sending an invalid certificate to the client device. When the user accepts the attacker's invalid certificate, encrypted messages sent by the client device can be intercepted and decrypted by the attacker's device. The attacker may also establish a secure session with the host device (e.g., by accepting the host device's valid certificate). The attacker may then act as a man-in-the-middle by intercepting, altering, removing, and/or inserting messages between the client device and the host device.

Such a man-in-the-middle attack may be difficult to detect because the host device may only see the traffic from the attacker device (e.g., via a connection established using a valid certificate), and may not see the traffic between the client device and the attacker device (e.g., via a connection established using the invalid certificate). Implementations described herein allow a host device to detect when a user, such as a website visitor, has accepted an invalid certificate for a website provided by the host device.

Figure 1A:
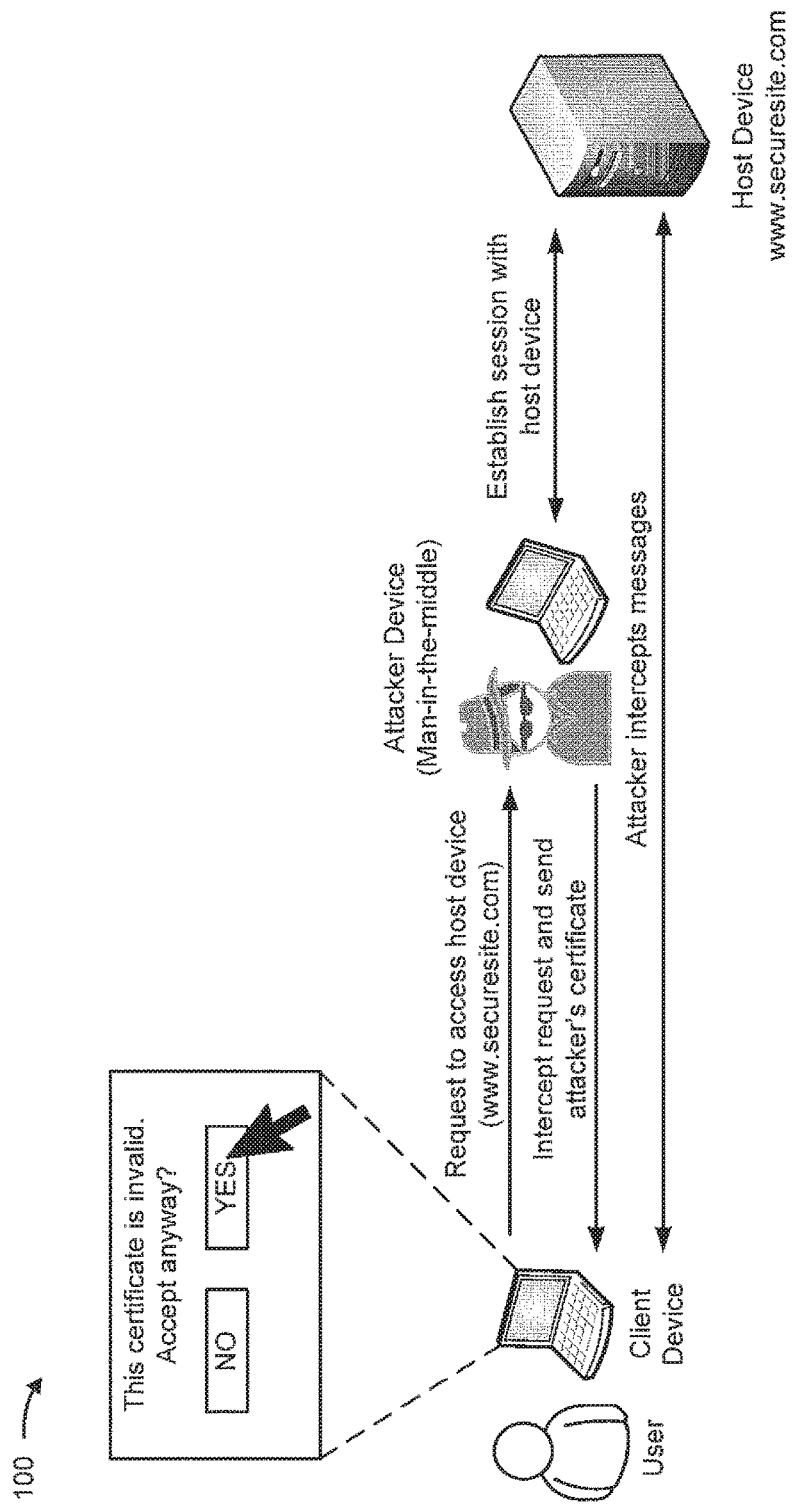
FIGS. 1A and 1B are diagrams of an overview of an example implementation described herein.
Figure 1B:
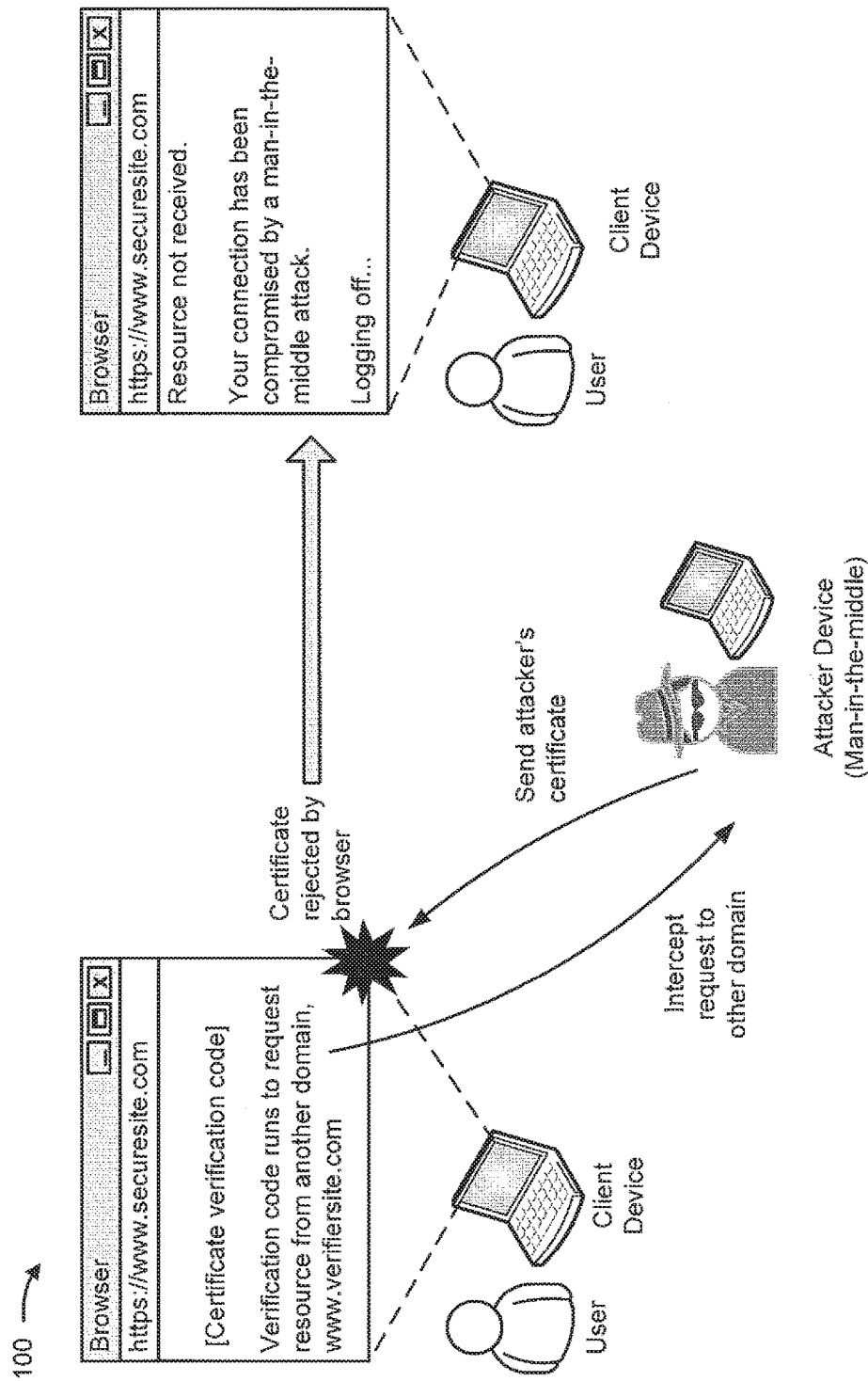

FIGS. 1A and 1B are diagrams of an overview of an example implementation 100 described herein. As shown in FIG. 1A, a user may use a client device to request to access a website, shown as www.securesite.com, that requires a secure connection to be established. The client device may transmit the request, intended for a host device associated with the website, and an attacker may intercept the request using an attacker device. For example, the request may be transmitted over an unsecured network (e.g., an unsecured WiFi network), and may be intercepted by the attacker device via the unsecured network. The attacker device may establish a session with the host device (e.g., by receiving a valid certificate from the host device), and may send an invalid certificate (shown as "attacker's certificate") to the client device.

Upon receiving the invalid certificate, the client device may notify the user (e.g., via a browser) that the certificate in invalid, and may prompt the user to indicate whether to accept the invalid certificate. If the user provides an indication to accept the invalid certificate, an encrypted session may be established between the client device and the attacker device. Because the attacker has established certified sessions with both the client device and the host device, the attacker may act as a man-in-the-middle by intercepting, altering, removing, and/or inserting messages communicated between the client device and the host device. In this way, the attacker may gain access to confidential information associated with the user, such as a credit card number, a bank account number, a password, or the like.

As shown in FIG. 1B, implementations described herein may detect and prevent such man-in-the-middle attacks by inserting certificate verification code into the code for the website. The verification code may request a resource, such as an image or a script, from a domain other than www.securesite.com. For example, the verification code may request a resource from a website shown as www.verifiersite.com.

As further shown, the attacker device may intercept the request for the resource from the other domain, and may send the attacker's certificate to attempt to act as a man-in-the-middle between the client device and the other domain. However, because this verification code runs in the background and attempts to embed a resource in the host website (e.g., www.securesite.com), the user will not be prompted to accept the attacker's certificate, and the attacker's certificate will be rejected as invalid. Thus, the host website will be unable to retrieve the resource. As shown, the browser may detect that the resource was not received, and may take appropriate action to block the man-in-the-middle attack, such as by ending the session, notifying the user of the attack, or the like. In this way, a host website may be able to detect and prevent man-in-the-middle attacks, and provide increased security to website visitors.

Figure 2:
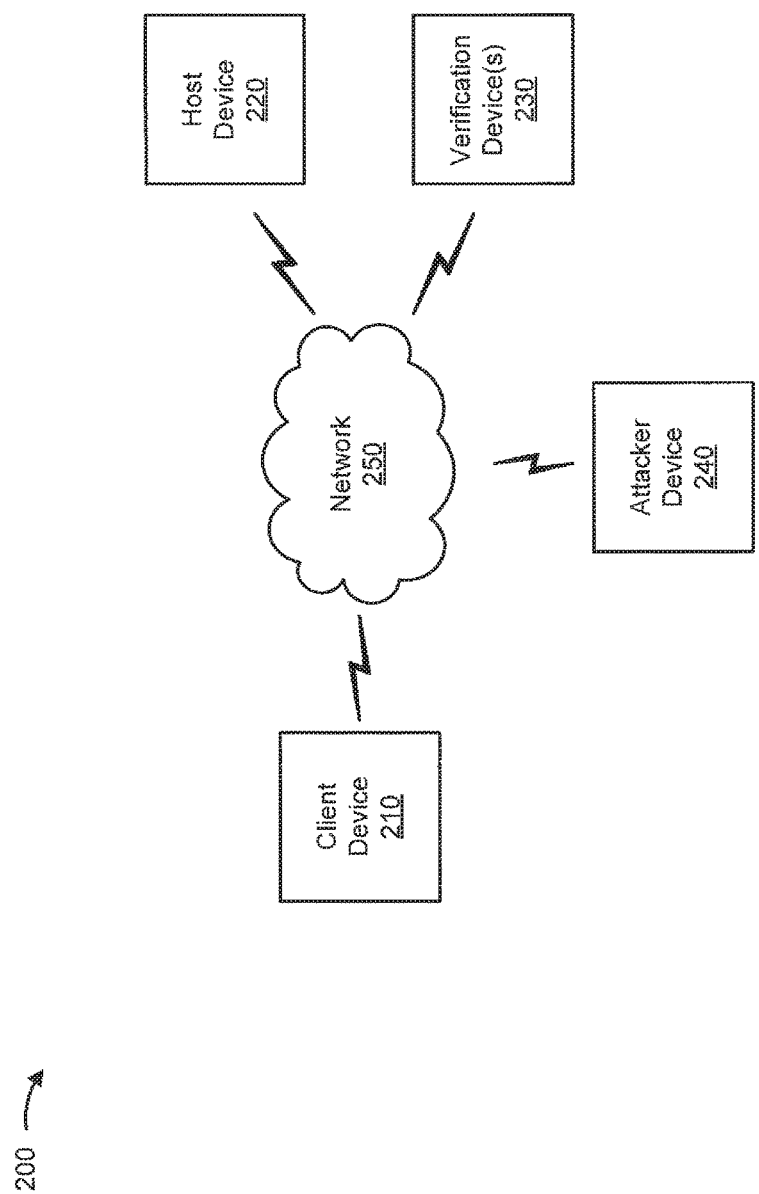
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a host device 220, one or more verification device(s) 230, an attacker device 240, and a network 250. Devices of environment 200 may interconnect via wired connections, wireless connections, or a combination of wired and wireless connections.

Client device 210 may include one or more devices capable of receiving and/or providing information via an encrypted connection (e.g., an SSL connection, a TLS connection, etc.), and/or capable of generating, storing, and/or processing information received and/or provided via an encrypted connection. For example, client device 210 may include a computing device, such as a laptop computer, a tablet computer, a handheld computer, a desktop computer, a mobile phone (e.g., a smart phone, a radiotelephone, etc.), a personal digital assistant, or a similar device. Client device 210 may provide requests to and/or receive responses from host device 220 and/or verification device 230 (e.g., via network 250). In some implementations, a request and/or a response may be intercepted by attacker device 240 via a man-in-the-middle attack. Client device 210 may receive and/or provide the information via an encrypted connection, such as a connection established based on a public key certificate.

Host device 220 may include one or more devices capable of receiving and/or providing information via an encrypted connection, and/or capable of generating, storing, and/or processing information received and/or provided via an encrypted connection. For example, host device 220 may include a computing device, such as a server (e.g., an application server, a content server, a host server, a web server, etc.), a desktop computer, a laptop computer, or a similar device. Host device 220 may receive information from and/or provide information to client device 210 (e.g., via network 250). In some implementations, the information may be intercepted by attacker device 240 via a man-in-the-middle attack. Host device 220 may receive and/or provide the information via an encrypted connection. Host device 210 may provide a public key certificate to client device 210 and/or attacker device 240 to establish the encrypted connection. In some implementations, host device 220 may provide code to client device 210 to be used to verify a public key certificate being used by client device 210 to access a website associated with host device 220.

Verification device(s) 230 may include one or more devices capable of receiving and/or providing information via an encrypted connection, and/or capable of generating, storing, and/or processing information received and/or provided via an encrypted connection. For example, verification device 230 may include a computing device, such as a server (e.g., an application server, a content server, a host server, a web server, etc.), a desktop computer, a laptop computer, or a similar device. Verification device 230 may receive information from and/or provide information to client device 210

(e.g., via network 250). In some implementations, the information may be intercepted by attacker device 240 via a man-in-the-middle attack. In some implementations, a website provided via a browser of client device 210 may request one or more resources from one or more verification devices 230, and verification device(s) 230 may respond to the request(s).

Attacker device 240 may include one or more devices capable of communicating with other devices via a network (e.g., network 250), and/or capable of receiving information provided by another device. For example, attacker device 240 may include a computing device, such as a laptop computer, a tablet computer, a handheld computer, a desktop computer, a mobile phone (e.g., a smart phone, a radiotelephone, etc.), a personal digital assistant, or a similar device. In some implementations, attacker device 220 may establish a first encrypted session with client device 210 using an invalid (e.g., unauthorized and/or untrusted) certificate, and may establish a second encrypted session with host device 220 and/or verification device 230 using a valid certificate. Attacker device 240 may intercept traffic from client device 210 and/or host device 220, and may act as a man-in-the-middle by altering, removing, or inserting traffic transferred between client device 210 and host device 220.

Network 250 may include one or more wired and/or wireless networks. For example, network 250 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 250 may include an unsecured network (e.g., a Wi-Fi network, a WiMAX network, a Bluetooth network, etc.) to which both client device 210 and attacker device 240 are connected.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
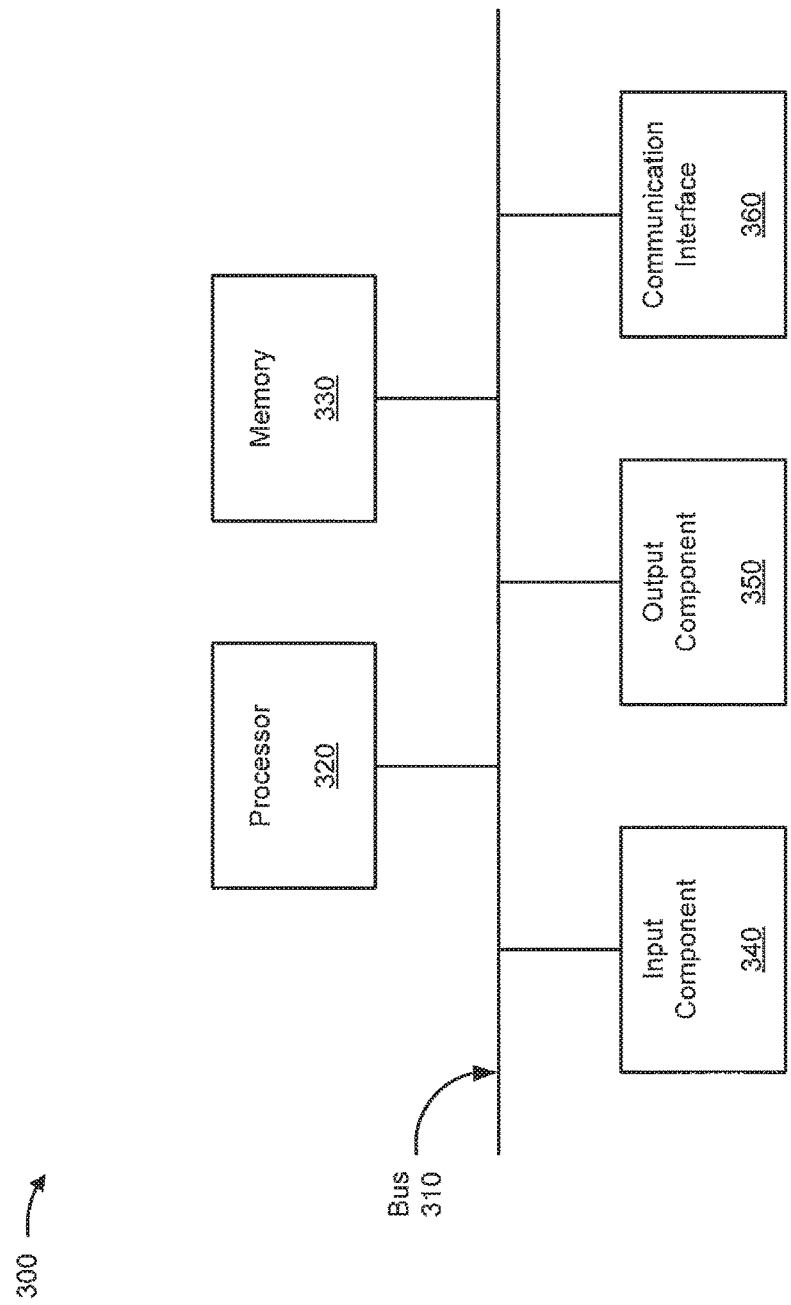
FIG. 3 is a diagram of example components of one or more devices of FIG. 2.

FIG. 3 is a diagram of example components of a device 300, which may correspond to client device 210, host device 220, verification device 230, and/or attacker device 240. In some implementations, client device 210, host device 220, verification device 230, and/or attacker device 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or a processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
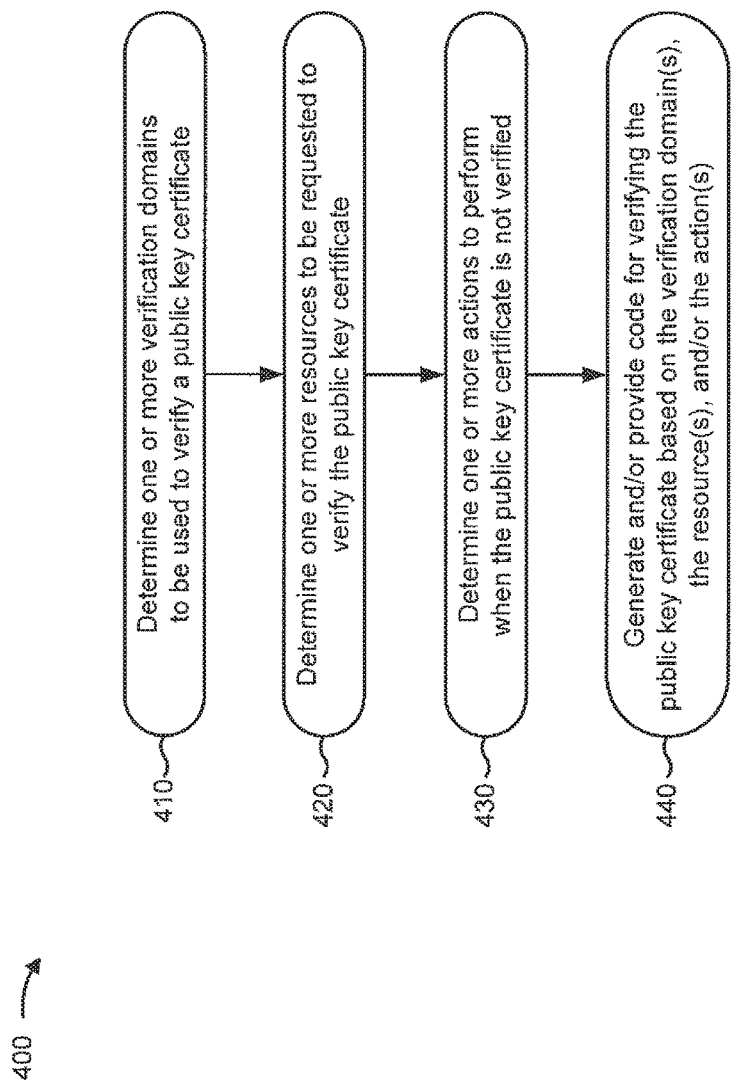
FIG. 4 is a flow chart of an example process for generating and providing code for verifying a public key certificate using a third party website.

FIG. 4 is a flow chart of an example process 400 for generating and providing code for verifying a public key certificate using a third party website. In some implementations, one or more process blocks of FIG. 4 may be performed by host device 220. In some implementations, one or more process blocks of FIG. 4 may be performed by another device or a group of devices separate from or including host device 220, such as client device 210, verification device 230, and/or attacker device 240.

As shown in FIG. 4, process 400 may include determining one or more verification domains to be used to verify a public key certificate (block 410). For example, host device 220 may determine one or more verification domains to be used to verify a public key certificate. In some implementations, host device 220 may receive user input identifying the one or more verification domains. A verification domain may include a domain name and/or a web address associated with a website and/or a verification device 230 that hosts the website. The verification domain may include a top-level domain and one or more sub-level domains. For example, a verification domain may include a string of characters that identifies the verification domain, a website, a resource location, etc. A public key certificate (sometimes referred to herein as a certificate) may include an electronic document that uses a digital signature to bind a public key with an identity (e.g., an identity associated with a domain). The certificate may be used to verify that the public key belongs to the domain.

In some implementations, host device 220 may determine (e.g., based on user input) multiple verification domains from which to select the one or more verification domains to be used to verify the public key certificate. For example, host device 220 may identify a list of verification domains, and may select one or more verification domains from the list. In some implementations, host device 220 may randomly select one or more verification domains from the list. Host device 220 may generate code that identifies the one or more verification domains to be used to verify the public key certificate.

The one or more verification domains may be different from the host domain, in some implementations. In this way, when host device 220 (e.g., a host domain) has been compromised due to an invalid certificate having been accepted by client device 210 during a man-in-the-middle attack, host device 220 can determine that the invalid certificate has been accepted by checking with the verification domains (e.g., associated with verification device(s) 230), as described elsewhere herein.

As further shown in FIG. 4, process 400 may include determining one or more resources to be requested to verify the public key certificate (block 420). For example, host device 220 may determine one or more resources to be requested from the verification domain(s), and to be used to verify the certificate. In some implementations, host device 220 may receive user input identifying the one or more resources. A resource may include, for example, an object accessible from the verification domain, such as an image, a script, an animation, audio, a video, or the like. For example, the resource may be an image accessible using a pointer (e.g., a uniform resource locator) that includes a verification domain (e.g., www.verifiersite.com/image.jpg). As another example, the resource may be a script accessible using a pointer that includes a verification domain (e.g., www.example.com/script.js).

As described elsewhere herein, when executing code on a website associated with host device 220, client device 210 may request the one or more resources from the verification domain(s), and may determine whether the one or more resources were properly received. If the one or more resources are received by client device 210, then client device 210 may determine that the certificate for the host domain, received by client device 210, is valid. If the one or more resources are not received by client device 210, then client device 210 may determine that an invalid certificate has been received, and that the connection has been compromised by a man-in-the-middle attack.

As further shown in FIG. 4, process 400 may include determining one or more actions to perform when the public key certificate is not verified (block 430). For example, host device 220 may determine one or more actions to perform when an invalid public key certificate, sent by attacker device 240, is accepted by client device 210. In some implementations, host device 220 may receive user input identifying the one or more actions. An action may include, for example, providing a notification via client device 210 (e.g., via a browser) to alert the user of the compromised connection, terminating the session, requiring the user to log in from a different network address (e.g., via a different local area network), requiring the user to reset a password, or the like.

As further shown in FIG. 4, process 400 may include generating and/or providing code for verifying the public key certificate based on the verification domain(s), the resource(s), and/or the action(s) (block 440). For example, host device 220 may generate code that identifies the verification domain(s), that identifies the resource(s) to be requested from the verification domain(s) to determine whether client device 210 has accepted an invalid certification, and that identifies the action(s) to be performed when code execution determines that client device 210 has accepted the invalid certificate. The code may include, for example, hypertext markup language (HTML) code, extensible markup language (XML) code, cascading style sheet (CSS) code, JavaScript code, or the like.

In some implementations, host device 220 may provide the code to client device 210. For example, a user of client device 210 may navigate, using a browser, to a host website associated with host device 220, and host device 220 may provide the code along with other code that provides the website for display in the browser. In other words, host device 220 may embed the code in the HTML code for the website, and may provide the embedded code and the remaining HTML code to client device 210 for execution by the browser. In some implementations, host device 220 may provide the code to client device 210 in one or more HTML responses to one or more HTML requests from client device 210. In this way, host device 220 may protect a user of client device 210 from a man-in-the-middle attack when a user of client device 210 has accepted an invalid certificate from an attacker executing a man-in-the-middle attack.

Although FIG. 4 shows example blocks of process 400, in some implementations, process 400 may include additional blocks, fewer blocks, different blocks, or differently arranged blocks than those shown in FIG. 4. Additionally, or alternatively, two or more of the blocks of process 400 may be performed in parallel.

Figure 5A:
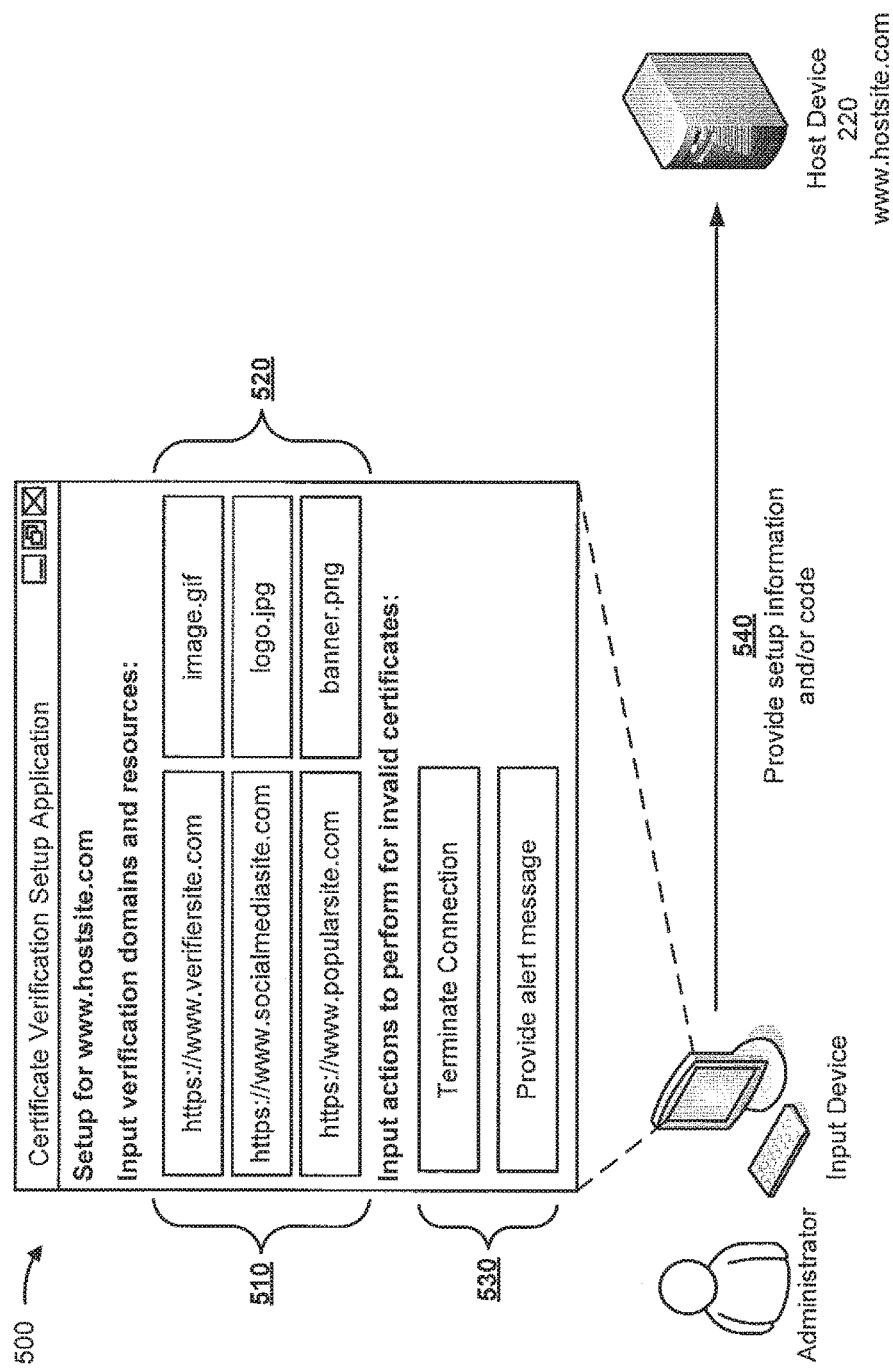
FIGS. 5A and 5B are diagrams of an example implementation relating to the example process shown in FIG. 4.
Figure 5B:
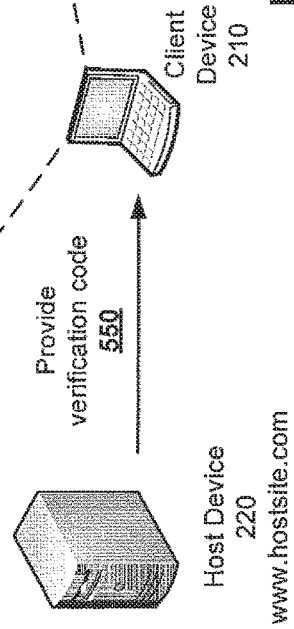

FIGS. 5A and 5B are diagrams of an example implementation 500 relating to example process 400 shown in FIG. 4. FIGS. 5A and 5B show an example of an administrator providing input to host device 220 to instruct host device 220 to generate and/or provide code to client device 210 to verify a public key certificate.

As shown in FIG. 5A, assume that an administrator interacts with an input device (e.g., a computing device) to provide setup information to host device 220, which is associated with a domain shown as www.hostsite.com. As shown by reference number 510, assume that the administrator inputs information identifying three verification domains to be used to verify a certificate of a user visiting www.hostsite.com, shown as https://www.verifiersite.com, https://www.socialmediasite.com, and https://www.popularsite.com. These verification domains are shown as examples, and the administrator may input additional verification domains, fewer verification domains, or different verification domains. In some implementations, the administrator may be provided with an option to randomly select verification domains from the list of provided verification domains, and/or may be provided with an option to set the quantity of verification domains to be used to verify a certificate.

As shown by reference number 520, assume that the administrator inputs three resources, each corresponding to one of the domains. As shown, assume that the administrator inputs information identifying an image resource of image- .gif for the verifiersite domain, an image resource of logo.jpg for the socialmediasite domain, and an image resource of banner.png for the popularsite domain. As shown by reference number 530, assume that the administrator inputs two actions to be performed when a certificate is determined to be invalid. The first action will cause the session associated with the invalid certificate to be terminated, and the second action will cause an alert message to be provided to client device 210 for display.

As shown by reference number 540, the input device may provide the setup information and/or code generated based on the setup information to host device 220. In some implementations, the input device may provide the setup information, such as information identifying the verification domains, the resources, and the actions, to host device 220, and host device 220 may generate code based on the setup information. Additionally, or alternatively, the input device may generate code based on the setup information, and may provide the generated code to host device 220. Additionally, or alternatively, the administrator may input code to the input device, and the input device may provide the code to host device 220.

As shown in FIG. 5B, and by reference number 550, host device 220 may provide the verification code to client device 210. For example, assume that a user of client device 210 interacts with a browser to navigate to the website www.hostsite.com, causing client device 210 to request the website from host device 220. Assume that host device 220 provides the website, including the verification code, to client device 210. Example verification code is shown in FIG. 5B.

As shown by reference number 560, the verification code may identify the verification domains and the resources to be used to verify a certificate on client device 210 being used to access the website. As shown by reference number 570, the verification code may include code to access the resource, such as by generating an image based on an image resource identified in the verification code (or by executing a script in the case where the resource is a script). As shown by reference number 580, the verification code may include code to check the dimensions and/or size of the image (or to check whether the script has executed) to determine whether the image resource (or the script resource) was accessible by client device 210. If the image was not generated, this is an indication that client device 210 has an invalid certificate for the host domain, because the browser of client device 210 will automatically reject invalid certificates for the verification code without prompting the user to accept or reject the invalid certificate. In this way, the administrator of the host domain can increase the security of the host domain website by preventing man-in-the-middle attacks that use invalid certificates.

As indicated above, FIGS. 5A and 5B are provided merely as an example. Other examples are possible and may differ from what was described with regard to FIGS. 5A and 5B.

Figure 6:
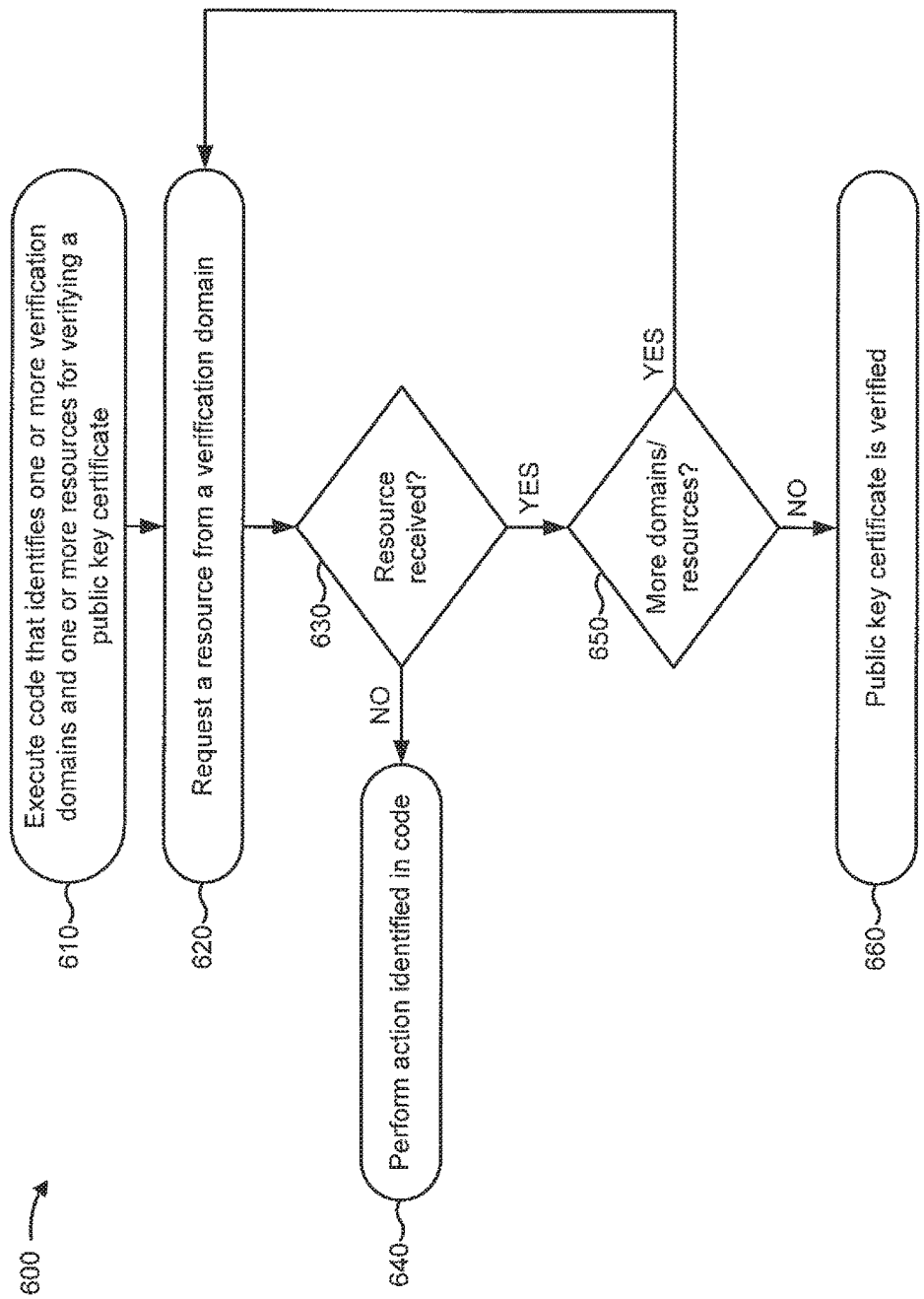
FIG. 6 is a flow chart of an example process for verifying a public key certificate using a third party website.

FIG. 6 is a flow chart of an example process 600 for verifying a public key certificate using a third party website. In some implementations, one or more process blocks of FIG. 6 may be performed by client device 210. In some implementations, one or more process blocks of FIG. 6 may be performed by another device or a group of devices separate from or including client device 210, such as host device 220, verification device 230, and/or attacker device 240.

As shown in FIG. 6, process 600 may include executing code that identifies one or more verification domains and one or more resources for verifying a public key certificate (block 610). For example, a user of client device 210 may request to access a website associated with a host domain, and the request may be intercepted via a man-in-the-middle attack from attacker device 240. Attacker device 240 may send an invalid certificate to client device 210, and the user of client device 210 may accept the invalid certificate. Attacker device 240 may then act as a man-in-the-middle between client device 210 and host device 220, with the ability to intercept, alter, delete, and insert messages between client device 210 and host device 220. To detect such a man-in-the-middle attack, when a user of client device 210 uses a browser to navigate to the website associated with the host domain, host device 220, associated with the host domain, may provide verification code (e.g., along with code for displaying the website in the browser) to client device 210. The verification code may identify one or more verification domains and/or one or more resources to be requested to verify a public key certificate being used by client device 210 to access the website.

As further shown in FIG. 6, process 600 may include requesting a resource from a verification domain (block 620). For example, client device 210 may request (e.g., using a browser) a resource, identified in the verification code, from a verification domain identified in the verification code. The resource may include, for example, an object accessible from the verification domain, such as an image, a script, an animation, audio, a video, or the like.

As further shown in FIG. 6, process 600 may include determining whether the resource was received (block 630). For example, client device 210 may request the resource and may determine whether the requested resource was received. For example, client device 210 may determine whether a requested image was received by comparing a dimension and/or a size (e.g., file size) of an image, corresponding to the requested image and rendered via the browser, to a threshold (e.g., an expected dimension and/or an expected size of the requested image). If the dimensions and/or size of the image satisfy the threshold (e.g., are smaller than a threshold), this may indicate that the image was not received, and that a broken image icon was rendered by the browser.

In some implementations, client device 210 may determine whether a script, requested from a verification domain, has executed on client device 210 (e.g., in the browser). For example, client device 210 may receive a message that a script failed to execute, indicating that a user of client device 210 may have accepted an invalid certificate for the host domain. As another example, client device 210 may determine whether a requested animation, audio file, or video file has been played or is playing via the browser. For example, client device 210 may determine a length of the animation, audio file, or video file. If the length is equal to zero, this may be an indication that the requested resource was not received, and that the user may have accepted an invalid certificate for the host domain.

As further shown in FIG. 6, if the requested resource was not received (block 630—NO), then process 600 may include performing an action identified in the code (block 640). For example, when client device 210 determines that the requested resource was not received, client device 210 may perform one or more actions identified in the verification code. When the resource is not received and/or loaded via client device 210 (e.g., via the browser), this may be an indication that the certificate for the verification domain is invalid. In some implementations, client device 210 may receive an indication (e.g., a warning message) that the resource is associated with a domain with an invalid certificate. Since the browser may reject embedded resources that have invalid certificates, without prompting the user to accept or reject the invalid certificate, this technique may be used to determine whether the user has accepted an invalid certificate for the host domain, since an attacker is likely to rewrite the certificates for each domain that a user of client device 210 requests.

The actions may include, for example, providing an indication that the public key certificate is invalid. The indication may be provided via client device 210 (e.g., via the browser) and/or may be provided to host device 220. The action may include, for example, terminating a connection, such as a connection between client device 210 and attacker device 240, between client device 210 and host device 220, and/or between host device 220 and attacker device 240. In some implementations, the action may include closing the browser, logging out of the website, locking the user's account, changing the user's password, terminating an active session, or the like.

In some implementations, an action may be performed by client device 210 (e.g., providing an indication via the browser, closing the browser, etc.). Additionally, or alternatively, an action may be performed by host device 220. For example, client device 210, upon determining that the connection is compromised, may provide an indication of the compromise to host device 220, and host device 220 may perform an action based on receiving the indication. In some implementations, client device 210 may provide the indication to host device 220 by including a tag in a request (e.g., an HTML request), such as a unique tag in a URL string, and sending the request with the tag to host device 220.

As further shown in FIG. 6, if the requested resource was received (block 630—YES), then process 600 may include determining whether there are more verification domains or resources to use to verify the public key certificate (block 650). For example, if client device 210 determines that a first resource, associated with a first domain, was received, then client device 210 may determine whether the verification code identifies a second resource, associated with a second domain.

As further shown in FIG. 6, if there are more verification domains or resources identified in the code (block 650—YES), then process 600 may include requesting the resource from the verification domain (block 620), determining whether the resource was received (block 630), and so forth. If there are not more verification domains or resources identified in the code (block 650—NO), then the public key certificate may be verified (block 660). For example, client device 210 may determine that there are no more verification domains or resources identified in the code (e.g., that all identified resources have been received), and may determine that the public key certificate is valid. In some implementations, when the public key certificate is valid, client device 210 and/or host device 220 may continue to operate normally (e.g., client device 210 may be granted access to the website, may transmit requests to host device 220, may receive responses from host device 220, etc.). Additionally, or alternatively, client device 210 may provide an indication, via the browser and/or to host device 220, that the public key certificate has been verified.

Although FIG. 6 shows example blocks of process 600, in some implementations, process 600 may include additional blocks, fewer blocks, different blocks, or differently arranged blocks than those shown in FIG. 6. Additionally, or alternatively, two or more of the blocks of process 600 may be performed in parallel.

Figure 7:
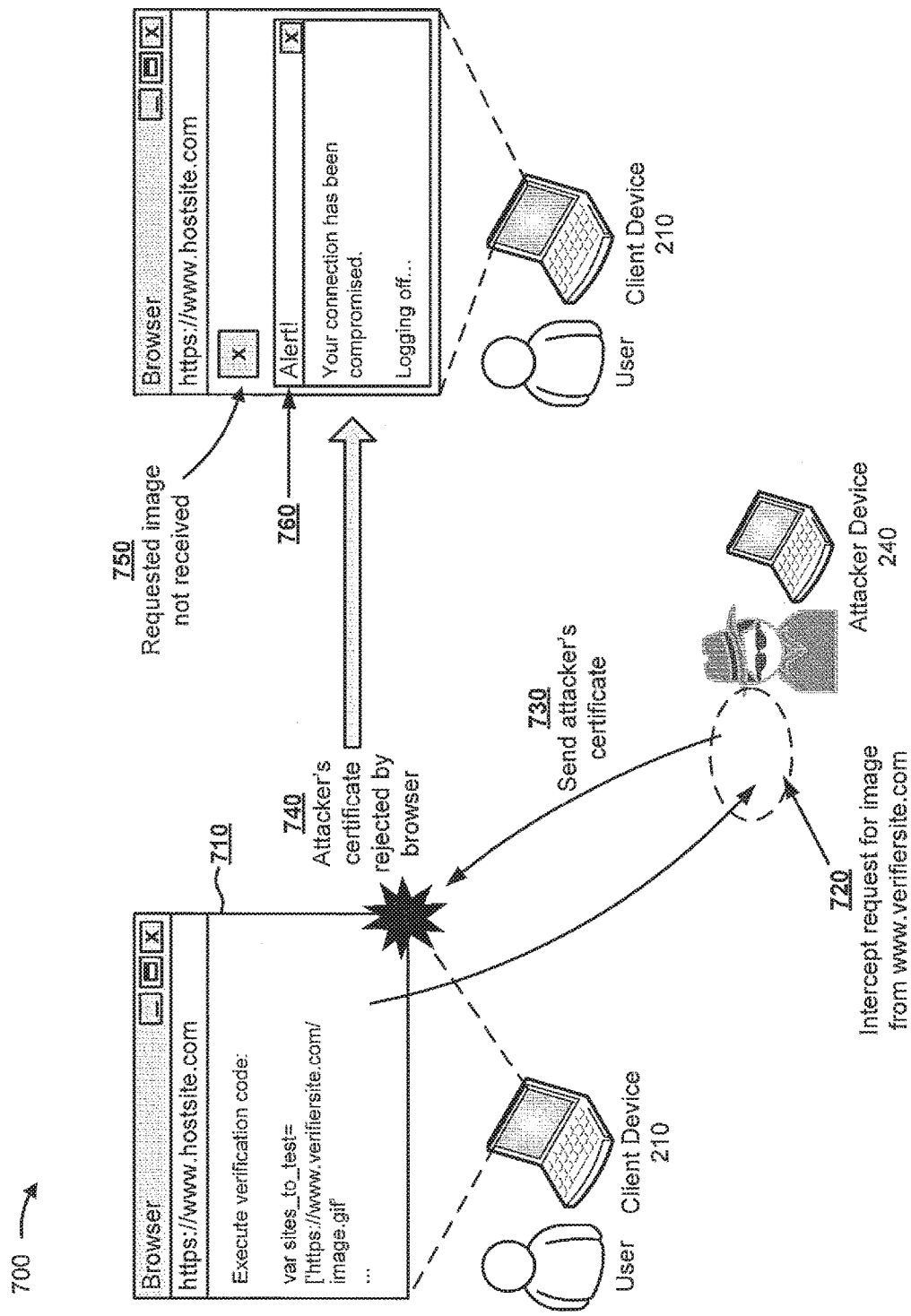
FIG. 7 is a diagram of an example implementation relating to the example process shown in FIG. 6.

FIG. 7 is a diagram of an example implementation 700 relating to example process 600 shown in FIG. 6. FIG. 7 shows an example where client device 210 requests an image resource from a verification domain, determines that the image resource was not received, and takes action to ensure that the connection with the host domain is secure.

For the purpose of FIG. 7, assume that a user of client device 210 has requested to access a website, www.hostsite.com, and that the request was intercepted via a man-in-the-middle attack from attacker device 240. Assume that attacker device 240 sent an invalid certificate to client device 210, and that the user of client device 210 accepted the invalid certificate. Assume that attacker device 240 is now acting as a man-in-the-middle between client device 210 and host device 220 associated with www.hostsite.com, with the ability to intercept, alter, delete, and insert messages between client device 210 and host device 220.

As shown in FIG. 7, and by reference number 710, assume that client device 210, having received verification code along with code for providing the host website, www.hostsite.com, executes the verification code to request an image resource from a verification domain shown as www.verifiersite.com. As shown by reference number 720, assume that attacker device 240 intercepts, from client device 210, the request for the image resource. As shown by reference number 730, assume that attacker device 240 sends the attacker's certificate (e.g., an invalid certificate) to establish a man-in-the-middle connection between client device 210 and the verification domain, www.verifiersite.com.

As shown by reference number 740, assume that the browser rejects the attacker's certificate because the certificate is invalid (e.g., not recognized by a trusted authority). Further assume that the browser does not prompt the user to accept the attacker's certificate because the browser silently rejects requests for embedded resources (e.g., requested via the verification code) that have invalid certificates. As shown by reference number 750, assume that because the browser rejected the invalid certificate, the requested image was not received. Because the requested image was not received, client device 210 determines that the certificate for www.hostsite.com is invalid. As shown by reference number 760, client device 210 provides an alert message indicating that the certificate is invalid, and that the connection has been compromised. Furthermore, client device 210 may take additional actions, such as terminating the connection, sending a notification to host device 220, etc.

As indicated above, FIG. 7 is provided merely as an example. Other examples are possible and may differ from what was described with regard to FIG. 7.

Figure 8:
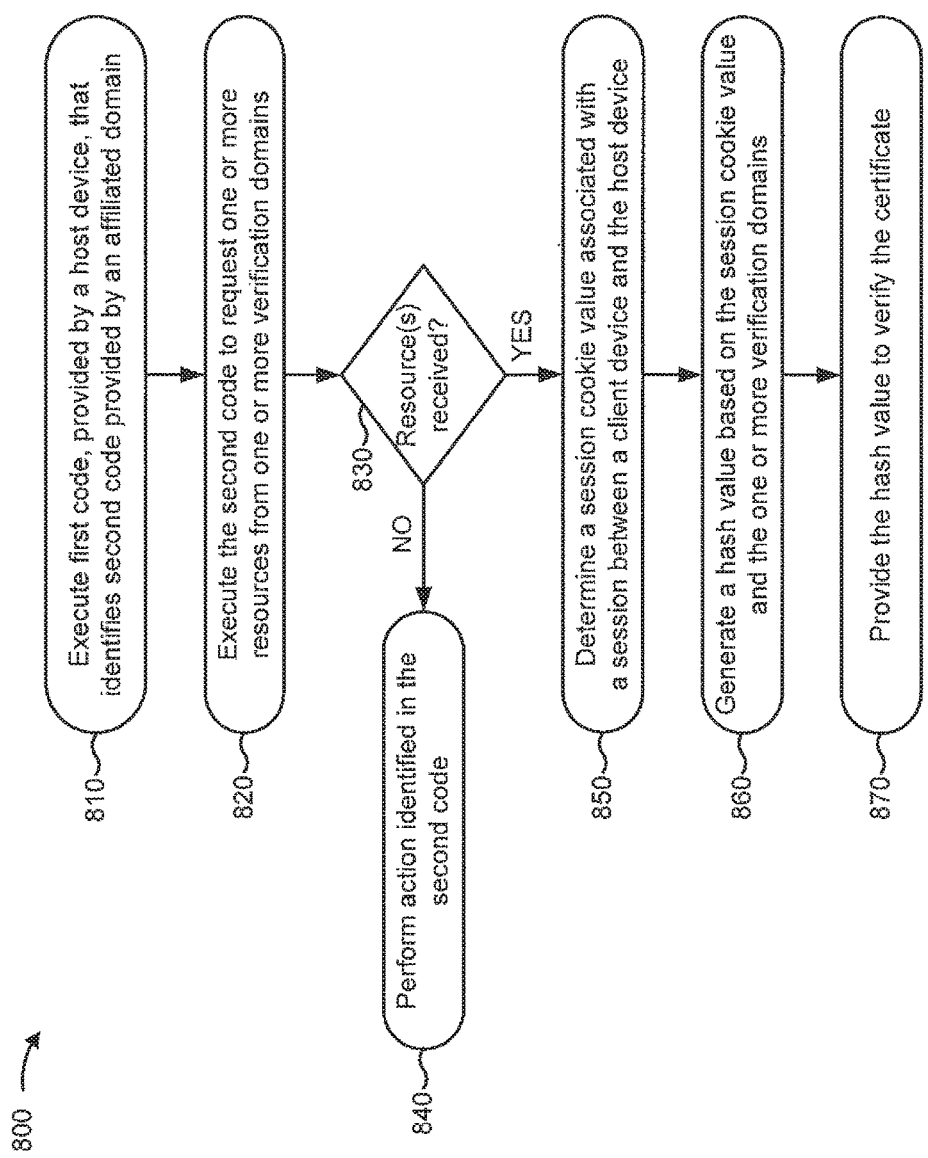
FIG. 8 is a flow chart of an example process for verifying a public key certificate using an affiliated domain.

FIG. 8 is a flow chart of an example process 800 for verifying a public key certificate using an affiliated domain. In some implementations, one or more process blocks of FIG. 8 may be performed by client device 210. In some implementations, one or more process blocks of FIG. 8 may be performed by another device or a group of devices separate from or including client device 210, such as host device 220, verification device 230, and/or attacker device 240.

As shown in FIG. 8, process 800 may include executing first code, provided by a host device, that identifies second code provided by an affiliated domain (block 810). For example, a user of client device 210 may use a browser to navigate to a website of a host domain, and host device 220, associated with the host domain, may provide first code (e.g., along with code for displaying the website in the browser) to client device 210. The first code may identify an affiliated domain, and may identify second code to be accessed via the affiliated domain. The affiliated domain (e.g., www.affiliatedomain.com) may be different from the host domain (e.g., www.hostdomain.com), but may be associated with the host domain in some manner. For example, the affiliated domain may be owned by the same company as the host domain, may be owned by an affiliated company (e.g., a parent company, a child company, a subsidiary company, etc.), may be owned by a company that has an agreement in place with the company that owns the host domain, may be associated with the same service provider or an affiliated service provider, etc. In some implementations, a manner in which the first code is included in the code for the website may be randomized. For example, host device 220 may randomize the location of the first code within the website code.

The first code (e.g., src="https://www.affiliatedomain.com/script.js"), when executed, may direct the browser to the affiliated domain (e.g., https://www.affiliatedomain.com), and may identify code on the affiliated domain (e.g., script.js) to be executed by the browser. Client device 210 (e.g., the browser) may use an encrypted connection (e.g., an SSL connection, a TLS connection, etc.) to access the affiliated domain. The code on the affiliated domain (e.g., hosted on an affiliate server device) may include, for example, a script.

As further shown in FIG. 8, process 800 may include executing the second code to request one or more resources from one or more verification domains (block 820). For example, client device 210 may execute the first code, which may cause client device 210 to retrieve the second code from the affiliated domain, and to execute the second code. The second code, when executed by client device 210, may cause client device 210 to request one or more resources from one or more verification domains (e.g., similar to the verification code discussed herein in connection with FIG. 6).

As further shown in FIG. 8, process 800 may include determining whether the one or more resources were received (block 830). For example, client device 210 may request the one or more resources, from the one or more verification domains (e.g., identified in the second code) and may determine whether the one or more requested resources were received, as discussed herein in connection with FIG. 6.

As further shown in FIG. 8, if the one or more resources are not received (block 830—NO), then process 800 may include performing an action identified in the second code (block 840). For example, when client device 210 determines that one or more requested resources were not received, client device 210 may perform one or more actions identified in the second code. When the resource is not received and/or loaded via client device 210 (e.g., via the browser), this may be an indication that the certificates for the verification domain and/or the host domain is invalid. Based on this determination, client device 210 may perform one or more actions (e.g., identified in the second code), as discussed herein in connection with FIG. 6. Additionally, or alternatively, host device 220 may perform the one or more actions, as discussed herein in connection with FIG. 6.

In some implementations, an action may include sending an indication, to host device 220, that the certificate for the host domain is invalid. In some implementations, client device 210 may send the indication via a cookie (e.g., an invalid certificate cookie). In some implementations, client device 210 may not send an indication and/or a cookie to host device 220 based on determining that the one or more resources were not received. Host device 220 may receive a request (e.g., an HTTP request) from client device 210 that does not include the cookie, and host device 220 may treat the lack of a cookie as an indication that the host domain has an invalid certificate.

As further shown in FIG. 8, if the one or more resources are received (block 830—YES), then process 800 may include determining a session cookie value associated with a session between a client device and the host device (block 850). For example, client device 210 may determine a session cookie value associated with a communication session (e.g., an encrypted communication session) between client device 210 and host device 220. The session cookie value may be provided, for example, by host device 220 to client device 210 when an initial session is established between client device 210 and host device 220.

As further shown in FIG. 8, process 800 may include generating a hash value based on the session cookie value and the one or more verification domains (block 860). For example, client device 210 may generate a hash value using the session cookie value and/or one or more verification domain strings that identify the one or more verification domains and/or the one or more resources. In some implementations, the hash value may be generated based on the one or more verification domains used to verify the certificate and/or the one or more resources (e.g., resource identifiers) used to verify the certificate (e.g., https://www.verifiersite.com/image.gif). In some implementations, client device 210 may generate the hash value based on multiple verification domain strings.

In some implementations, a verification domain string may include a domain identifier, a resource identifier, and/or a random value. For example, the verification domain string may include a random value appended to the end of a resource identifier (e.g., https://www.verifiersite.com/image.gif?ABCDE). The random value (e.g., of random length) may be inserted by host device 220 when providing the verification code to the affiliated domain server device. The random value may be used to prevent an attacker from determining the full verification domain string.

Client device 210 may generate the hash value using a hash algorithm to combine the verification domain string and the session cookie. For example, client device 210 may use the secure hash algorithm (SHA) (e.g., SHA-0, SHA-1, SHA-2, SHA-3, etc.), the advanced encryption standard (AES), the RSA algorithm, the message-digest algorithm (e.g., MD4, MD5, etc.), or the like, to generate the hash value.

As further shown in FIG. 8, process 800 may include providing the hash value to verify the certificate (block 870). For example, client device 210 may provide the hash value to host device 220. Host device 220 may use the hash value to verify the certificate. For example, host device 220 may verify whether the received hash value is the correct hash value (e.g., by comparing the received hash value to a computed hash value based on the verification domain string(s) and the session cookie). If the hash value is correct, then the certificate may be verified, and host device 220 may communicate normally with client device 210. If the hash value is incorrect, host device 220 may perform one or more actions based on an invalid certificate, as described elsewhere herein.

In this way, client device 210 and/or host device 220 may verify whether a certificate, associated with a communication session between client device 210 and host device 220, is valid, and may detect when a certificate has been rewritten (e.g., by an attacker utilizing a man-in-the-middle attack).

By verifying the validity of certificates, a website associated with host device 220 may be made more secure.

Although FIG. 8 shows example blocks of process 800, in some implementations, process 800 may include additional blocks, fewer blocks, different blocks, or differently arranged blocks than those shown in FIG. 8. Additionally, or alternatively, two or more of the blocks of process 800 may be performed in parallel.

FIGS. 9A-9D are diagrams of an example implementation 900 relating to example process 800 shown in FIG. 8. FIGS. 9A-9D show an example of verifying a public key certificate using an affiliated domain.

Figure 9A:
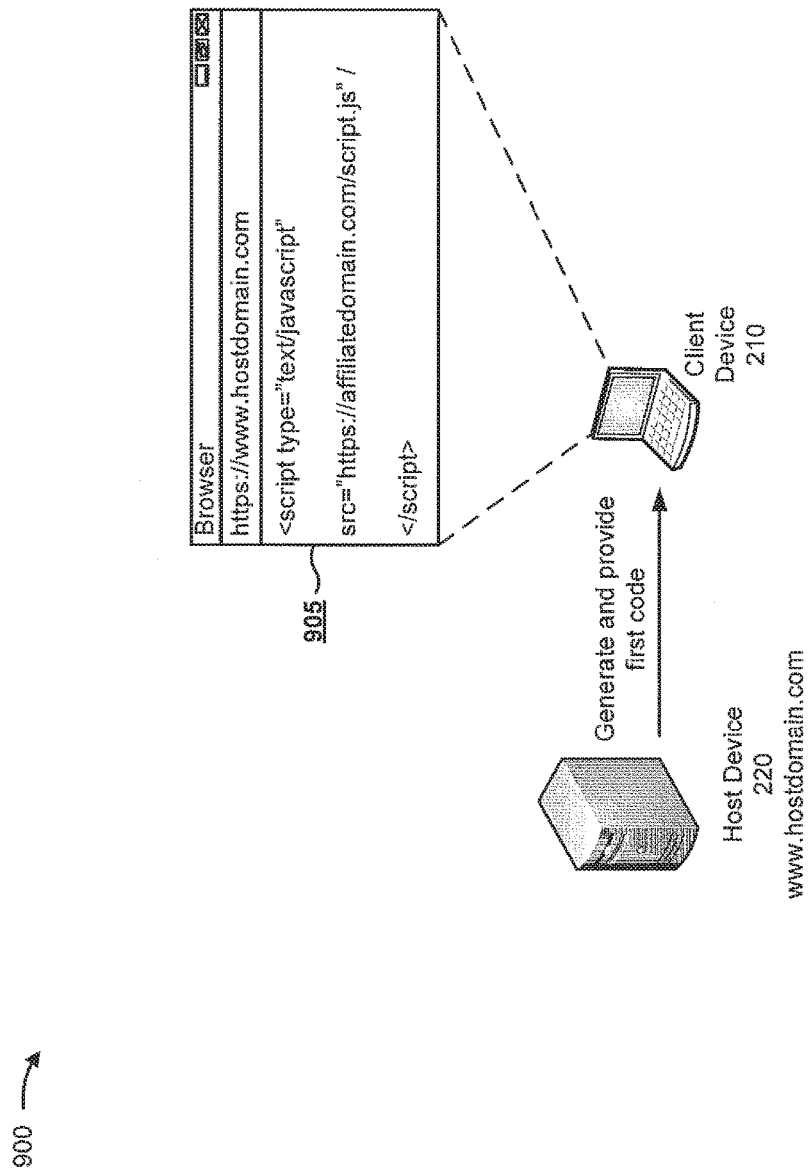
FIGS. 9A-9D are diagrams of an example implementation relating to the example process shown in FIG. 8.

As shown in FIG. 9A, assume that host device 220 generates and provides first code to client device 210. For example, assume that a user of client device 210 interacts with a browser to navigate to the website www.hostdomain.com, causing client device 210 to request the website from host device 220. Assume that host device 220 provides the website, including the first code, to client device 210. Example first code is shown in FIG. 9A. For example, as shown by reference number 905, assume that the first code includes a verification domain string that identifies a verification domain as https://affiliatedomain.com, and identifies a resource to be requested, shown as script.js.

Figure 9B:
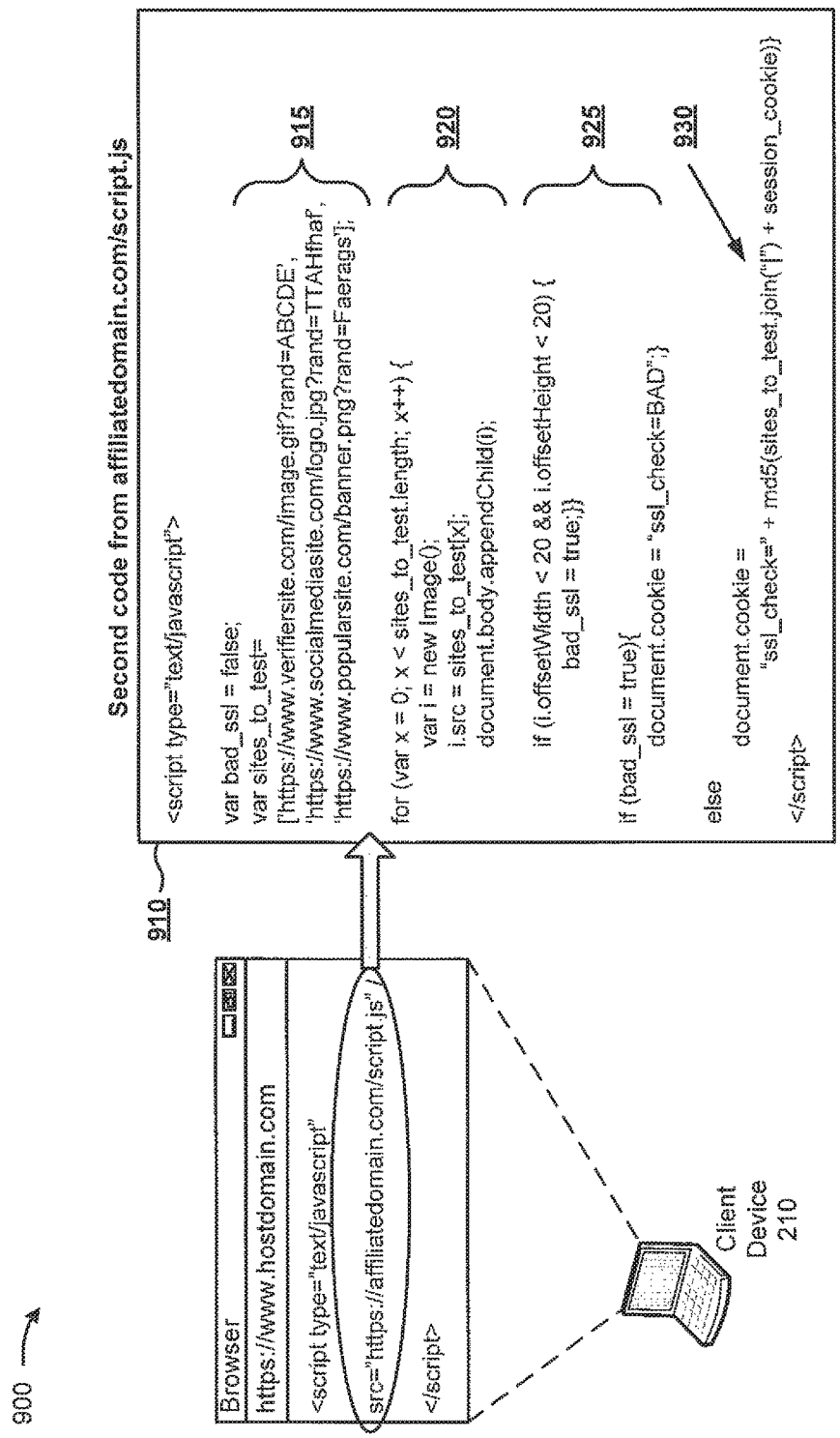

As shown in FIG. 9B, assume that client device 210 executes the first code, which causes client device 210 to retrieve second code, such as verification code, from the affiliated domain, affiliatedomain.com. Example verification code is shown by reference number 910, and includes example code sections 915, 920, 925, and 930. Code section 915 identifies three verification domains (e.g., https://www.verifiersite.com, https://www.socialmedisite.com, and https://www.popularsite.com) and three respective resource identifiers that identify resources hosted by the verification domains (e.g., image.gif, logo.jpg, and banner.png). The verification domain strings included in code section 915 also include random strings (e.g., rand=ABCDE, rand=TTAHfhaf, and rand=Faerags).

Code section 920 includes code to access and/or retrieve the resources, such as by generating an image based on an image resource identified in the verification code (or by executing a script in the case where the resource is a script). Code section 925 includes code to check a dimension and/or a size of the image (or to check whether the script has executed) to determine whether the image resource (or the script resource) was accessible by client device 210. Code section 925 also includes code to set a cookie to indicate an invalid certificate when the image resource is not received and/or generated. Code section 930 includes code to generate a hash value based on the verification domain strings and the session cookie when the image resource is received and/or generated, and to provide the generated hash value as a cookie to host device 220.

Figure 9C:
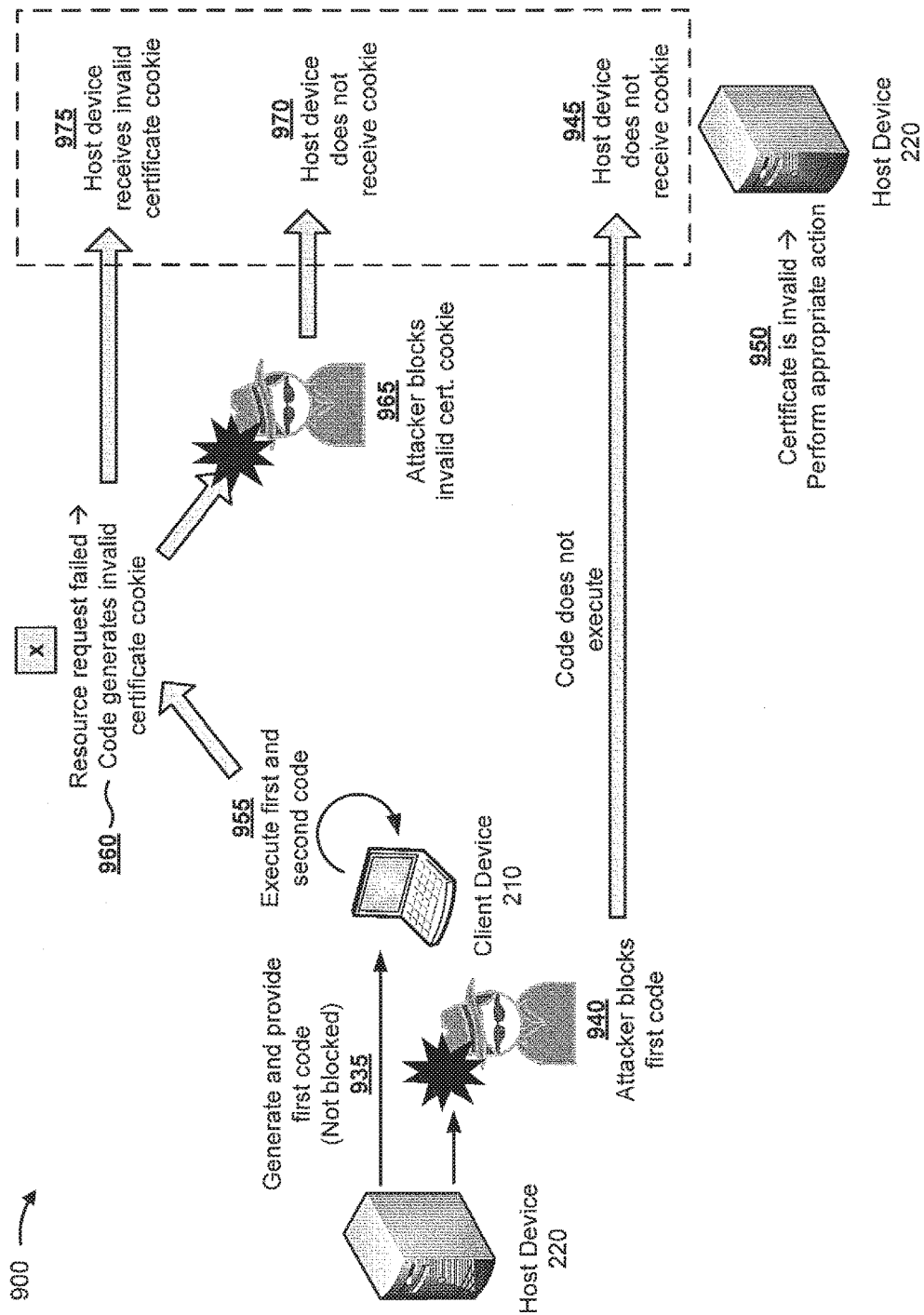

FIG. 9C depicts several scenarios where host device 220 determines that the certificate is invalid. As shown by reference number 935, assume that host device 220 generates and provides first code to client device 210, and that the first code references second code provided via an affiliated domain. As shown by reference number 940, assume that an attacker (e.g., using attacker device 240) blocks the first code from being transmitted to client device 210. As a result, the first code and the second code are not executed by client device 210, and thus host device 220 does not receive a cookie that would have been generated via execution of the second code, as shown by reference number 945. As a result, host device 220 determines that the certificate in invalid, and performs an appropriate action, as shown by reference number 950.

In another scenario, assume that the attacker does not block the first code, and client device 210 receives the first code. As shown by reference number 955, client device 210 executes the first code and the second code. As shown by reference number 960, assume that a resource request, identified in the second code, has failed (e.g., an image was not retrieved, a script was not executed, etc.). Based on determining that the resource request has failed, client device 210 generates an invalid certificate cookie. As shown by reference number 965, assume that the attacker blocks the invalid certificate cookie. As a result, host device 220 does not receive the invalid certificate cookie, as shown by reference number 970. Based on not receiving the invalid certificate cookie in a subsequent request from client device 210, host device 220 determines that the certificate in invalid, and performs an appropriate action, as shown by reference number 950.

In yet another scenario, assume that the attacker does not block the invalid certificate cookie, and host device 220 receives the invalid certificate cookie, as shown by reference number 975. Based on receiving the invalid certificate cookie, host device 220 determines that the certificate in invalid, and performs an appropriate action, as shown by reference number 950.

Figure 9D:
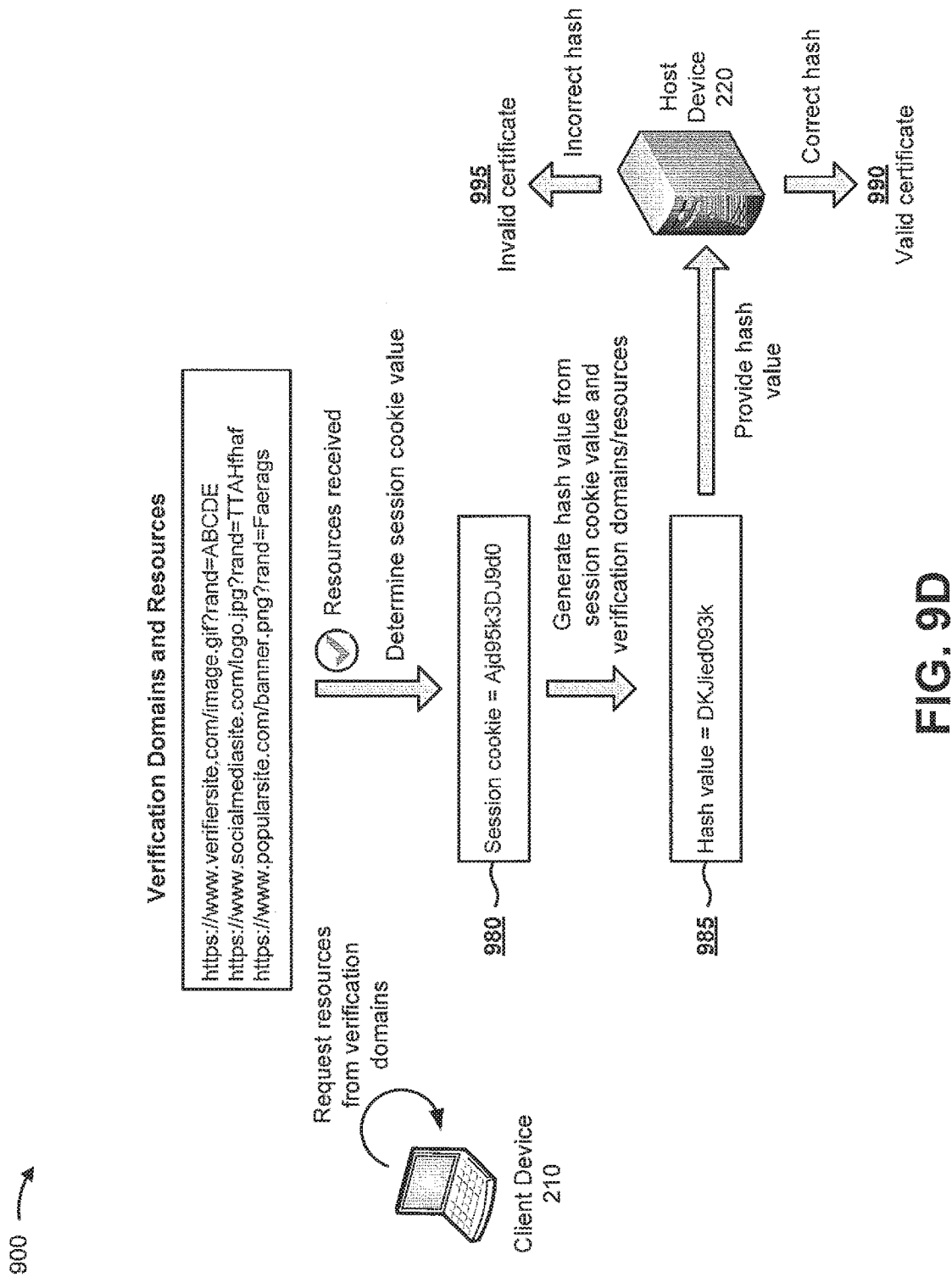

FIG. 9D depicts two scenarios where client device 210 generates a hash value and provides the hash value to host device 210: one scenario where the hash value is determined to be correct by host device 220, and one scenario where the hash value is determined to be incorrect by host device 220. As shown in FIG. 9D, assume that client device 210 requests resources from verification domains based on verification domain strings identified in the second code, and determines that the resources have been received. As shown by reference number 980, assume that client device 210 determines a session cookie value for a session between client device 210 and host device 220. As shown by reference number 985, assume that client device 210 generates a hash value using the verification domain strings and the session cookie, and subsequently provides the hash value to host device 220.

As shown by reference number 990, assume that host device 220 determines that the hash value is correct. Based on this determination, host device 220 may determine that the public key certificate is valid, and may proceed to communicate with client device 210 as normal. As shown by reference number 995, assume that host device 220 determines that the hash value is incorrect. Based on this determination, host device 220 may determine that the public key certificate is invalid, and may perform an appropriate action, such as terminating the connection, providing a warning indicator to client device 210, or the like.

As indicated above, FIGS. 9A-9D are provided merely as an example. Other examples are possible and may differ from what was described with regard to FIGS. 9A-9D.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Some implementations are described herein as receiving information from a device or providing information to a device. These phrases may refer to receiving information directly from a device or providing information directly to a device, without the information being transferred via an intermediary device situated along a communication path between devices. Additionally, or alternatively, these phrases may refer to receiving information, provided by a device, via one or more intermediary devices (e.g., network devices), or providing information to a device via one or more intermediary devices.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    determining, by a device, one or more verification domains to be used to verify a public key certificate,
        the one or more verification domains being different from a host domain associated with the device;
    determining, by the device, one or more resources to be requested to verify the public key certificate;
    determining, by the device, one or more actions to perform when the public key certificate is not valid;
    generating, by the device, executable verification code, for performing the one or more actions without prompting a user to accept or reject the public key certificate, based on determining the one or more verification domains, based on determining the one or more resources, and based on determining the one or more actions;
    embedding, by the device, the executable verification code in other code; and
    providing, by the device, the other code, with the executable verification code, for execution by a client device.

2. The method of claim 1, where the one or more verification domains include a top-level domain and one or more sub-level domains.

3. The method of claim 1, where determining the one or more verification domains comprises:
    identifying a plurality of verification domains to be used to verify the public key certificate; and
    selecting the one or more verification domains, from the plurality of verification domains, based on user input.

4. The method of claim 1, where the one or more resources include an object accessible from a verification domain of the one or more verification domains.

5. The method of claim 1, where the one or more actions include one or more of:
    a first action for providing a notification, via the client device, regarding a compromised connection,
    a second action for terminating a session, or
    a third action for requiring the user to log in from a different local area network that is different from a local area network that the client device is using.

6. The method of claim 1, where the public key certificate includes an electronic document that uses a digital signature to bind a public key with an identity.

7. The method of claim 6, where the identity is associated with a domain.

8. A system comprising:
    a memory; and
    one or more processors to:
        determine one or more verification domains to be used to verify a public key certificate,
            the one or more verification domains being different from a host domain;
        determine one or more resources to be requested to verify the public key certificate;
        determine one or more actions to perform when the public key certificate is not valid;
        generate executable verification code, for performing the one or more actions without prompting a user to accept or reject the public key certificate, based on determining the one or more verification domains, based on determining the one or more resources, and based on determining the one or more actions;
        embed the executable verification code in other code; and
        provide the other code with the executable verification code for execution by a client device.

9. The system of claim 8, where the one or more verification domains include a top-level domain and one or more sub-level domains.

10. The system of claim 8, where, when determining the one or more verification domains, the one or more processors are to:
    identify a plurality of verification domains to be used to verify the public key certificate; and
    select the one or more verification domains, from the plurality of verification domains, based on user input.

11. The system of claim 8, where the one or more resources include an object accessible from a verification domain of the one or more verification domains.

12. The system of claim 8, where the one or more actions include one or more of:
    a first action for providing a notification, via the client device, regarding a compromised connection,
    a second action for terminating a session, or a third action for requiring the user to log in from a different local area network that is different from a local area network that the client device is using.

13. The system of claim 8, where the public key certificate includes an electronic document that uses a digital signature to bind a public key with an identity.

14. The system of claim 13, where the identity is associated with a domain.

15. A non-transitory computer-readable medium storing instructions, the instructions comprising:
 one or more instructions that, when executed by at least one processor, cause the at least one processor to:
  determine one or more verification domains to be used to verify a public key certificate,
   the one or more verification domains being different from a host domain;
  determine one or more resources to be requested to verify the public key certificate;
  determine one or more actions to perform when the public key certificate is not valid;
  generate executable verification code, for performing the one or more actions without prompting a user to accept or reject the public key certificate, based on determining the one or more verification domains, based on determining the one or more resources, and based on determining the one or more actions;
  embed the executable verification code in other code; and
  provide the other code with the executable verification code for execution by a client device.

16. The non-transitory computer-readable medium of claim 15, where the one or more verification domains include a top-level domain and one or more sub-level domains.

17. The non-transitory computer-readable medium of claim 15, where the one or more instructions to determine the one or more verification domains comprise:
 one or more instructions to:
  identify a plurality of verification domains to be used to verify the public key certificate; and
  select the one or more verification domains, from the plurality of verification domains, based on user input.

18. The non-transitory computer-readable medium of claim 15, where the one or more resources include an object accessible from a verification domain of the one or more verification domains.

19. The non-transitory computer-readable medium of claim 15, where the one or more actions include an action for requiring a user to log in from a different local area network that is different from a local area network that the client device is using.

20. The non-transitory computer-readable medium of claim 15, where the public key certificate includes an electronic document that uses a digital signature to bind a public key with an identity associated with a domain.

* * * * *